US010309441B2

(12) United States Patent
Dionne

(10) Patent No.: US 10,309,441 B2
(45) Date of Patent: Jun. 4, 2019

(54) FASTENER AND FASTENER ASSEMBLY HAVING IMPROVED VIBRATIONAL AND TIGHTENING CHARACTERISTICS

(71) Applicant: Duraforce Holdings, LLC, Martinsville, VA (US)

(72) Inventor: Pierre A. Dionne, Martinsville, VA (US)

(73) Assignee: Duraforce Holdings, LLC, Roanoke, VA (US)

(*) Notice: Subject to any disclaimer, the term of this patent is extended or adjusted under 35 U.S.C. 154(b) by 0 days.

(21) Appl. No.: 15/729,539

(22) Filed: Oct. 10, 2017

(65) Prior Publication Data
US 2018/0031026 A1 Feb. 1, 2018

Related U.S. Application Data

(63) Continuation of application No. 14/636,207, filed on Mar. 3, 2015, now Pat. No. 9,784,299, which is a
(Continued)

(51) Int. Cl.
F16B 39/24 (2006.01)
F16B 39/26 (2006.01)
(Continued)

(52) U.S. Cl.
CPC ............ F16B 39/24 (2013.01); F16B 5/0241 (2013.01); F16B 35/06 (2013.01); F16B 39/26 (2013.01); F16B 43/004 (2013.01)

(58) Field of Classification Search
CPC ........ F16B 5/0241; F16B 35/06; F16B 39/24; F16B 39/26; F16B 43/004
(Continued)

(56) References Cited

U.S. PATENT DOCUMENTS 1,303,784 A * 5/1919 Emery .................... F16B 39/24
411/143
1,376,296 A * 4/1921 Snow ...................... F16B 39/36
411/269
(Continued)

FOREIGN PATENT DOCUMENTS

GB 161685 A 4/1921
GB 2201216 A 8/1988
(Continued)

OTHER PUBLICATIONS

JPO, Decision of Rejection of Japanese Patent Application No. 2015-500580, dated Oct. 24, 2017.
(Continued)

Primary Examiner — Roberta S Delisle
(74) Attorney, Agent, or Firm — NK Patent Law

(57) ABSTRACT

A fastener assembly is provided. The fastener assembly includes an insert having a radial circumference. An annulus extends from the insert and defines an annular end distal from the insert. The annulus further defines a radial cutout section along a length thereof for providing a flex point. The annulus is configured for being radially compressed by a blind hole of a working surface upon tightening of a nut. A nut is positioned adjacent the insert on an end distal the annulus, and a threaded bolt extends from the nut and through the annulus, wherein the bolt is configured to be accepted by the blind hole.

18 Claims, 13 Drawing Sheets

Related U.S. Application Data continuation of application No. 13/802,418, filed on Mar. 13, 2013, now Pat. No. 8,967,932.

(60) Provisional application No. 61/675,192, filed on Jul. 24, 2012, provisional application No. 61/610,651, filed on Mar. 14, 2012.

(51) Int. Cl.
*F16B 5/02* (2006.01)
*F16B 35/06* (2006.01)
*F16B 43/00* (2006.01)

(58) Field of Classification Search
USPC ............. 411/55, 337, 354, 360–361, 916
See application file for complete search history.

(56) References Cited

U.S. PATENT DOCUMENTS

| | | | | |
|---|---|---|---|---|
| 1,384,019 A * | 7/1921 | Johnston | ............ | F16B 39/26 411/270 |
| 1,717,789 A * | 6/1929 | Larrad | ............ | F16B 39/36 411/237 |
| 1,806,506 A * | 5/1931 | Savidge | ............ | F16B 39/36 411/237 |
| 2,361,814 A * | 10/1944 | Berry | ............ | F16B 39/36 411/270 |
| 2,690,201 A * | 9/1954 | Fineran | ............ | F16B 39/36 411/270 |
| 3,225,809 A * | 12/1965 | Peak, Sr. | ............ | F16B 39/36 411/223 |
| 5,190,423 A * | 3/1993 | Ewing | ............ | F16B 39/282 411/134 |
| 6,220,801 B1 | 4/2001 | Lin | | |
| 6,554,552 B2 * | 4/2003 | McKinlay | ............ | F16B 39/26 411/134 |

FOREIGN PATENT DOCUMENTS

| | | |
|---|---|---|
| JP | 6357820 U | 4/1988 |
| JP | 1150011 A | 6/1989 |
| JP | 1122715 A | 1/1999 |
| JP | 2002372024 A | 12/2002 |
| JP | 201217814 A | 1/2012 |

OTHER PUBLICATIONS

CIPO, Examination Report of Canadian Patent Application No. 2,912,319, dated Jul. 4, 2017.
EPO, Examination Report for European Patent Application No. 13761463.2, dated Mar. 6, 2018.
SIPO, Reexamination Decision for Chinese Patent Application No. 201380014142.7, dated Nov. 5, 2018.

* cited by examiner

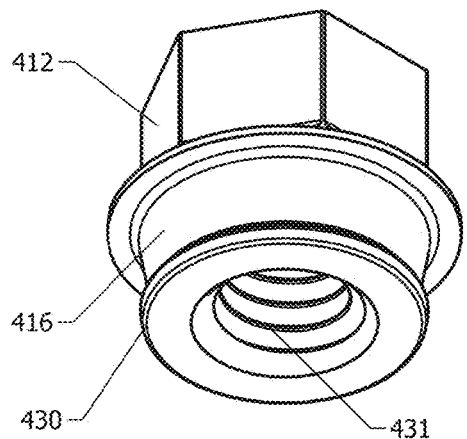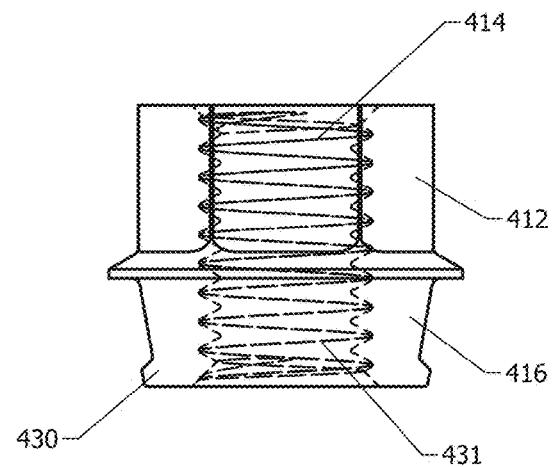
Figure 12A　　　　　　　Figure 12B
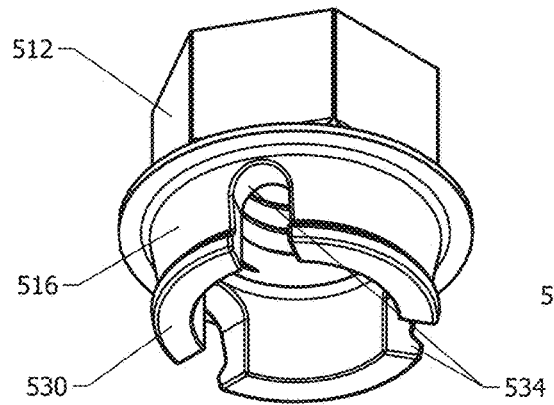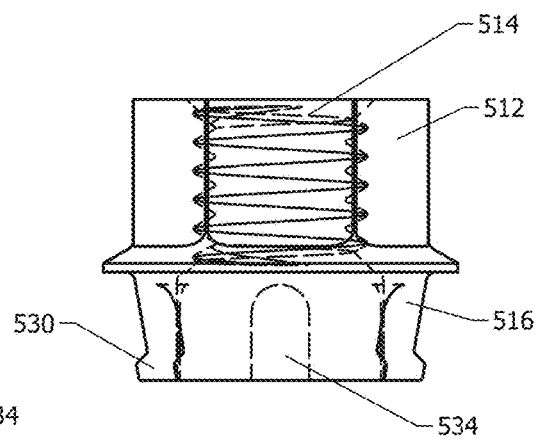
Figure 13A　　　　　　　Figure 13B

US 10,309,441 B2

FASTENER AND FASTENER ASSEMBLY HAVING IMPROVED VIBRATIONAL AND TIGHTENING CHARACTERISTICS

CROSS REFERENCE TO RELATED APPLICATIONS

This application is a continuation of U.S. patent application Ser. No. 14/636,207 filed on Mar. 3, 2015, which is a continuation of U.S. patent application Ser. No. 13/802,418 filed Mar. 13, 2013 and issued as U.S. Pat. No. 8,967,932, which claims priority to U.S. Provisional Patent Application No. 61/610,651 filed Mar. 14, 2012 and U.S. Provisional Patent Application No. 61/675,192 filed Jul. 24, 2012, the entire contents of which are hereby incorporated by reference.

TECHNICAL FIELD

This disclosure is related to a fastener and fastener assembly, and, more particularly, towards a fastener and fastener assembly having improved vibrational and tightening characteristics.

BACKGROUND

Fasteners and various fastener assemblies are utilized for securing one or more articles to one another in a variety of settings including commercial, residential, industrial, and the like. These fasteners may be, for example, a nut and bolt assembly in which a threaded portion of the bolt is received within a cooperatively threaded portion of the nut. Nut and bolt assemblies are preferred because of their uniformly accepted use, cost-efficient manufacturing, and acceptable performance in a variety of settings.

Conventional nuts and bolts are susceptible to loosening under vibrational and other loads. Many manners have been introduced in order to combat the vibrational and other forces. For example, some users may provide multiple nuts that are tightened against each other in order to increase the total frictional forces between the nuts and the bolt. Other manners include the use of a split washer having one portion raised relative to the other, i.e. a spring washer, the acts to provide a spring bias to absorb vibrational forces acting on the nut.

Still other manners have been provided for increasing the effectiveness of traditional fasteners such as nuts and bolts. For example, fasteners having multiple-part assemblies have been employed. However, these fastener assemblies have increased cost and may not always have desired effectiveness.

A need therefore exists for a solution that addresses these disadvantages.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

Disclosed herein is a fastener assembly. The fastener assembly includes an insert having a radial circumference; an annulus extending from the insert and defining an annular end distal from the insert, wherein the annulus defines a radial cutout section along a length thereof for providing a flex point, wherein the annulus is configured for being radially compressed by a blind hole of a working surface upon tightening of a nut.

According to one or more embodiments, the fastener assembly further includes a nut positioned adjacent the insert on an end distal the annulus, and a threaded bolt extending from the nut and through the annulus, wherein the bolt is configured to be accepted by the blind hole.

According to one or more embodiments, wherein the annulus end and the insert have the same inner diameter.

According to one or more embodiments, wherein the annulus end defines a shoulder that catches on an internally circumferentially extending rim of the blind hole.

According to one or more embodiments, wherein the annulus is free of threads on an inner facing surface thereof.

According to one or more embodiments, wherein the hole defines a taper for applying progressively increasing compression of the annulus end.

According to one or more embodiments, wherein the annulus defines a taper from the insert to the annulus end.

According to one or more embodiments, wherein the annulus defines a first taper from the insert towards the annulus end and a second taper extending from the first taper to the annulus end.

According to one or more embodiments, wherein the annulus and insert are coaxially aligned.

According to one or more embodiments, wherein the annulus consists of two cutout sections positioned opposite of each other.

According to one or more embodiments, wherein an outwardly facing surface of the annulus contains textures or grooves for engaging the blind hole.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed invention is not limited to the specific methods and instrumentalities disclosed. In the drawings:

FIGS. 12A and 12B illustrate an annulus according to one or more embodiments disclosed herein;

FIGS. 13A and 13B illustrate an annulus according to one or more embodiments disclosed herein;

DETAILED DESCRIPTION

The presently disclosed invention is described with specificity to meet statutory requirements. However, the description itself is not intended to limit the scope of this patent. Rather, the inventors have contemplated that the claimed invention might also be embodied in other ways, to include different steps or elements similar to the ones described in this document, in conjunction with other present or future technologies.

Figure 1:
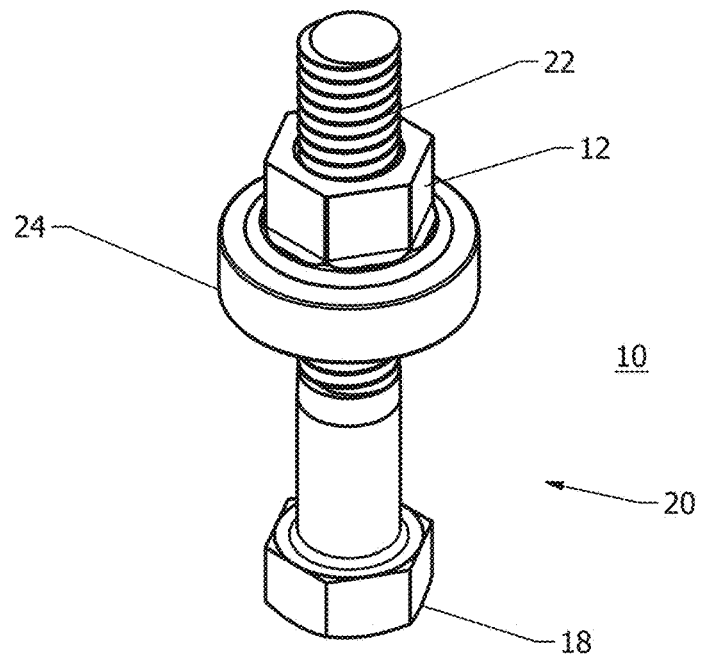
FIG. 1 illustrates a perspective view of a fastener assembly according to one or more embodiments disclosed herein.

FIG. 1 is a perspective view of a fastener assembly according to one or more embodiments disclosed herein and generally designated 10. The fastener assembly 10 includes a nut 12 and a compression collar 24 that may be carried by the nut 12. The compression collar 24 may have a fixed orientation relative to the nut 12 or may be provided for rotatable movement thereabout. An elongate fastener 20 having a shank 22 may be provided. The elongate fastener 20 may include a head 18 for providing a surface about which the fastener 20 may be rotated. The head 18 is illustrated as a hex head but may be any appropriately configured shape, size, and configuration.

Figure 2:
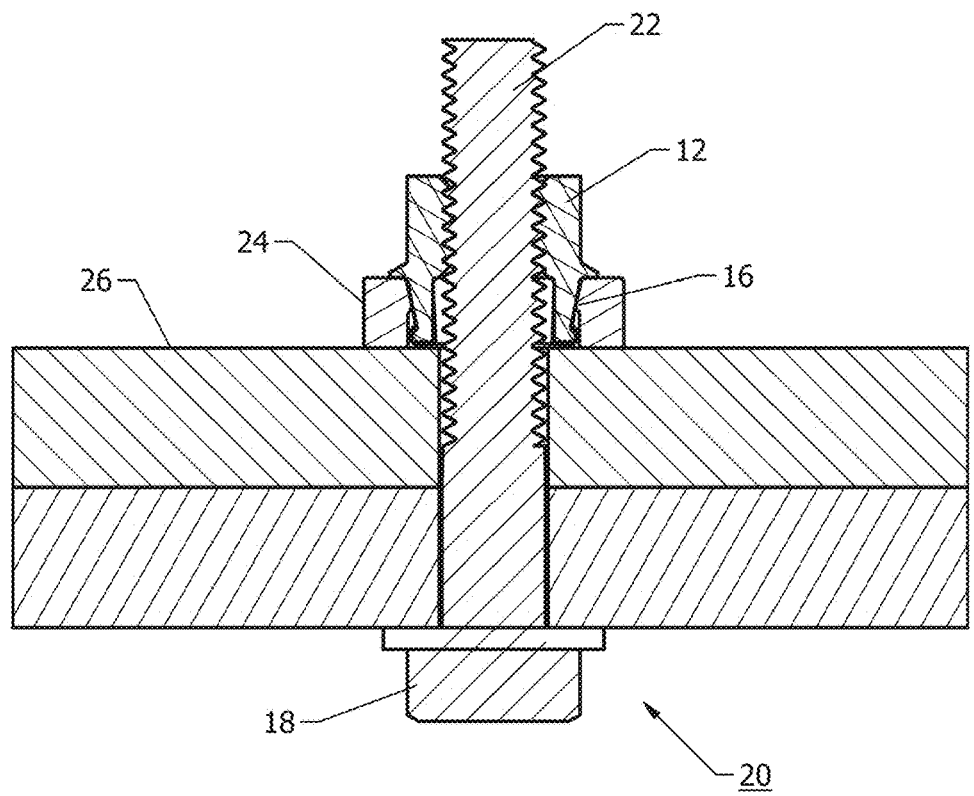
FIG. 2 illustrates a cross-sectional view of a fastener assembly according to one or more embodiments disclosed herein.
Figure 3:
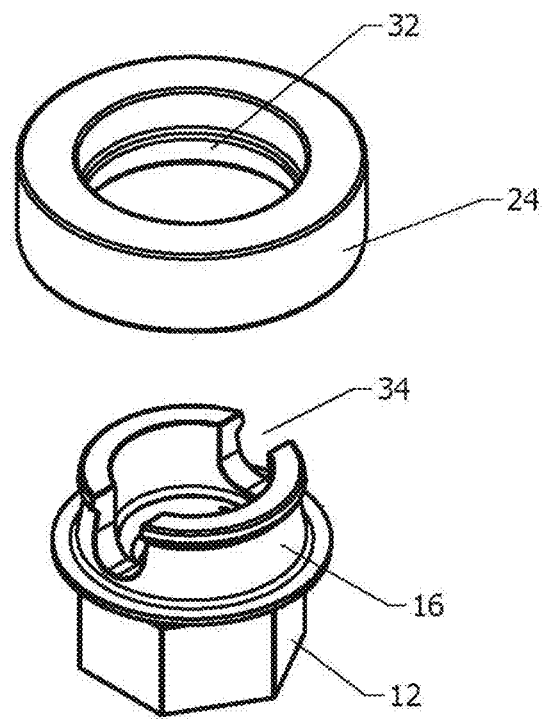
FIG. 3 illustrates an exploded perspective view of a fastener assembly according to one or more embodiments disclosed herein.
Figure 4:
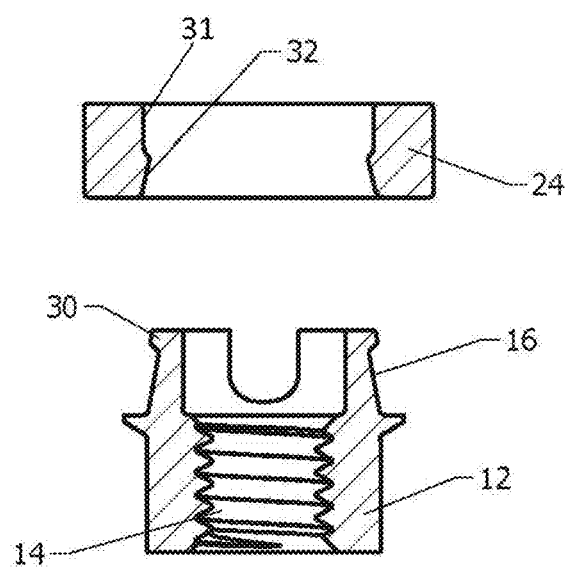
FIG. 4 illustrates an exploded side view of a fastener assembly according to one or more embodiments disclosed herein.

With further reference to the cross-sectional depiction in FIG. 2, the perspective, exploded depiction in FIG. 3, and the cross-sectional depiction in FIG. 4, the nut 12 may further include an internally threaded portion 14. The internally threaded portion 14 may be a coarse, fine, or other appropriately configured threaded portion. An annulus 16 may extend from the nut 12. The annulus 16 may have an internally threaded portion or may be generally free of a threaded portion as illustrated in FIG. 2. The annulus 16 is configured for receiving the shank 22 of the elongate fastener 20. The annulus 16 may be fixedly-engaged with the nut 12 or, alternatively, rotatably or otherwise not fixedly-engaged therewith.

The annulus 16 may define a generally converging taper as illustrated in FIG. 2, FIG. 3, and FIG. 4. Alternatively, the annulus 16 may define a generally perpendicularly extending portion from the nut 12. Additionally, the annulus 16 may include or define one or more additional characteristics, such as, for example, a nylon insert for providing an increased frictional coefficient, an adhesive-based substrate for providing increased adherence, one or more grooves or textures defined on a shank-facing surface, and the like. A circumferentially extending shoulder 30 may be defined on any portion of the annulus 16 and is configured for being received with the compression collar 24. The annulus 16 may define a cutout section 34 along a length thereof for providing a flex point of the annulus 16 about the shank 22.

The compression collar 24 is illustrated in further detail in FIG. 3 and FIG. 4. The compression collar 24 is configured for deflecting the annulus 16 upon tightening of the nut 12 about a working surface as illustrated in FIG. 2. The deflection of the annulus 16 is caused by the interaction defined about the annulus 16 abutting an inner groove 31 of the compression collar 24. The inner groove 31 of the compression collar 24 defines a dimension that is smaller than a corresponding diameter dimension of the annulus 16 when the annulus 16 is in an undeflected state. The inner groove 31 may define a taper.

The circumferentially extending shoulder 30 of the annulus 16 may be configured for being received by a shoulder 32 defined within the inner groove 31 of the compression collar 24. In this manner, the annulus 16 may be engaged with the shoulder 32 of the compression collar 24 to form a fastener assembly that is one integral portion. Alternatively, the annulus 16 may have compression and deflection characteristics such that an operator can press or pinch opposing portions of the annulus 16 and then position the annulus 16 into the compression collar 24 before releasing the annulus 16 into selective engagement with the compression collar 24. In one or more embodiments, the inner groove 31 may be generally converging, diverging, or generally straight in orientation.

The compression of annulus 16 by compression collar 24 upon tightening of the nut 12 against working surface 26 may be provided for increasing the vibrational or anti-rotational properties of the annulus 16. For example, compression of the annulus 16 may induce a spring bias engagement force between the annulus 16 and the compression collar 24. In this manner, the induced spring bias counteracts vibrational forces that may occur during use of equipment and the like that utilizes the fastener assembly 10. Additionally, frictional and other forces may be induced by engagement of an inner portion of the annulus with the shank 22 of the elongate fastener 20. In one or more embodiments, the inner portion may include a threaded portion configured for receiving the threaded portion of the shank 22.

Figure 5:
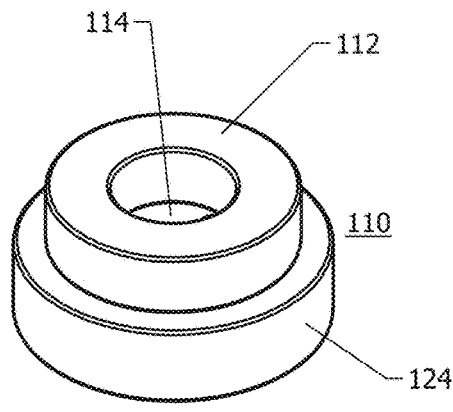
FIG. 5 illustrates a top-facing perspective view of a fastener assembly according to one or more embodiments disclosed herein.
Figure 6:
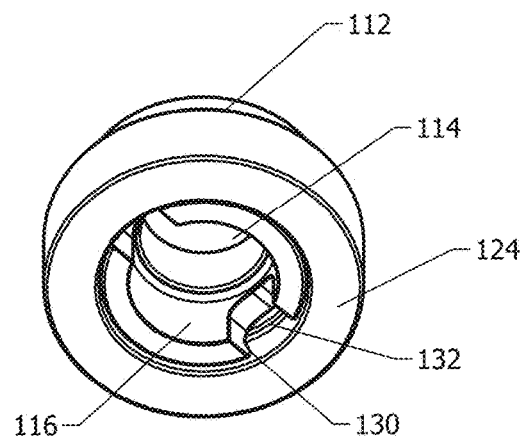
FIG. 6 illustrates a bottom-facing perspective view of a fastener assembly according to one or more embodiments disclosed herein.
Figure 7:
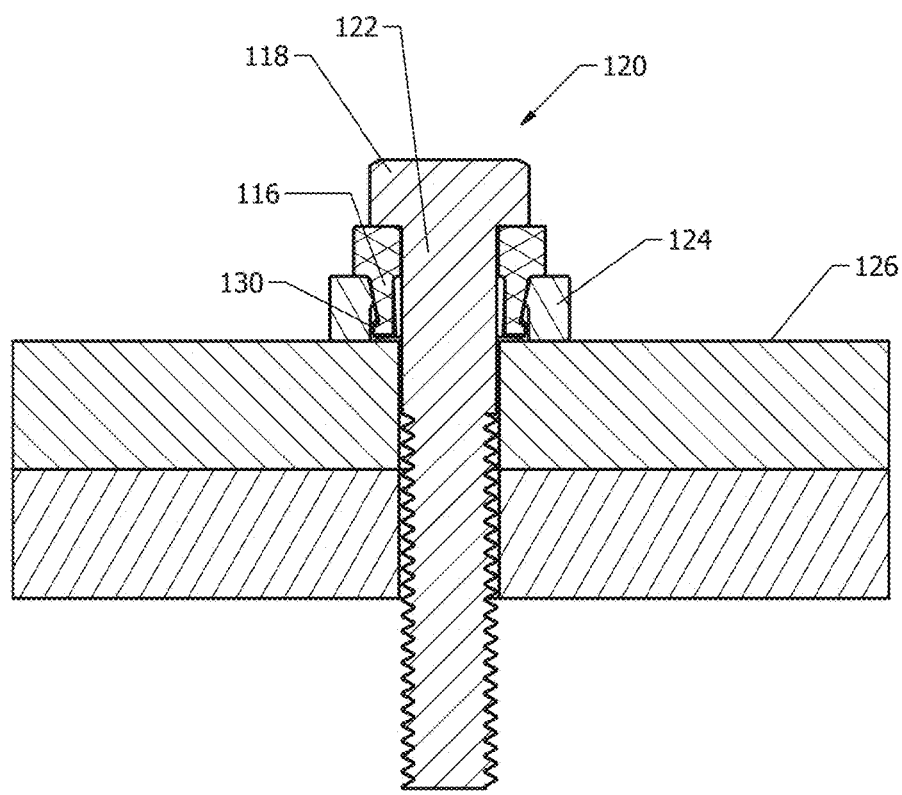
FIG. 7 illustrates a cross-sectional view of a fastener assembly according to one or more embodiments disclosed herein.

A fastener sharing some characteristics with fastener 10 is illustrated in FIGS. 5 through 9B and generally designated 110. With particular reference to FIG. 5 and FIG. 6, the fastener assembly 110 includes a nut 112 and a compression collar 124 that may be carried by the insert 112. An elongate fastener 120 having a shank 122 may be provided as illustrated in FIG. 7. Similar to fastener 20, the elongate fastener 120 may include a head 118 for providing a surface about which the fastener 120 may be rotated. The head 118 is illustrated as a hex head but may be any appropriately configured shape, size, and configuration.

Figure 8:
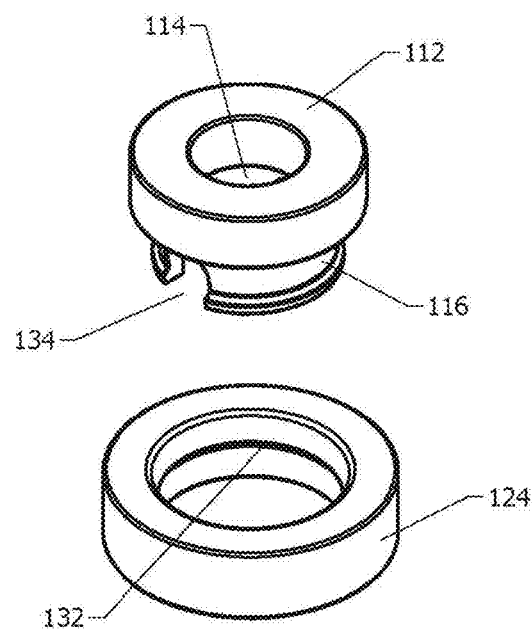
FIG. 8 illustrates an exploded perspective view of a fastener assembly according to one or more embodiments disclosed herein.
Figures 9A, 9B:
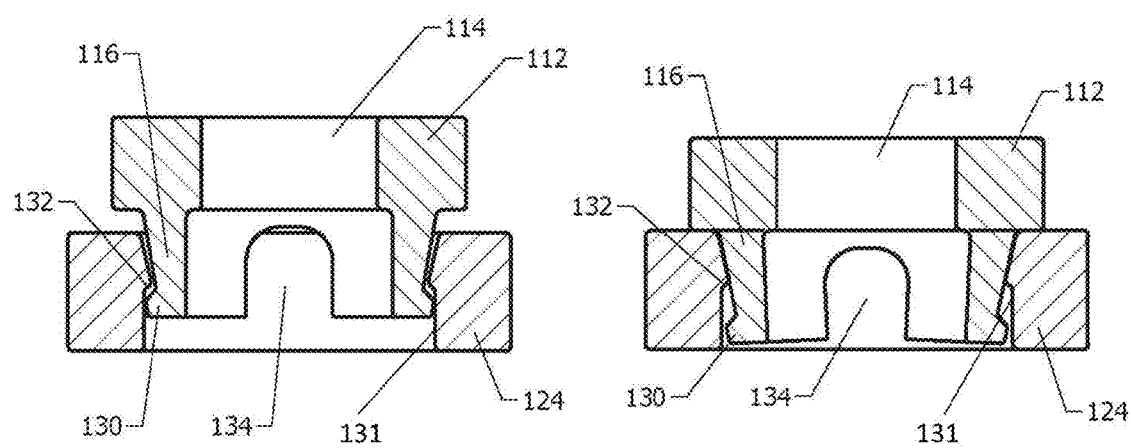
FIG. 9A illustrates a cross-sectional view of a fastener assembly according to one or more embodiments disclosed herein.
FIG. 9B illustrates a cross-sectional view of a fastener assembly according to one or more embodiments disclosed herein.

With further reference to the cross-sectional depiction in FIG. 7, the perspective exploded depiction in FIG. 8, and the cross-sectional depiction in FIG. 9A and FIG. 9B, the insert 112 may further define an opening 114. An annulus 116 may extend from the insert 112. The annulus 116 may have an internally threaded portion or may be generally free of a threaded portion as illustrated in FIG. 9A and FIG. 9B. The annulus 116 is configured for receiving the shank 122 of the elongate fastener 120. The annulus 116 may define a generally converging taper as illustrated in FIG. 9A and FIG. 9B. Alternatively, the annulus 116 may define a generally perpendicularly extending portion from the insert 112. Additionally, the annulus 116 may include or define one or more additional characteristics, such as, for example, a nylon insert for providing an increased frictional coefficient, an adhesive-based substrate for providing increased adherence, one or more grooves or textures defined on a shank-facing surface, and the like. A circumferentially extending shoulder 130 may be defined on any portion of the annulus 16 and is configured for being received with the compression collar 124. The annulus 116 may define a cutout section 134 along a length thereof for providing a flex point of the annulus 116 about the shank 122.

The compression collar 124 is illustrated in further detail in FIG. 8. The compression collar 124 is configured for deflecting the annulus 116 upon tightening of the insert 112 about a working surface 126 as illustrated in FIG. 7. The deflection of the annulus 116 is caused by the interaction about the annulus 116 abutting a tapered, inner groove 30 of the compression collar 124. The inner groove 131 of the compression collar 124 defines a dimension that is smaller than a corresponding diameter dimension of the annulus 116 when the annulus 116 is in an undeflected state.

The circumferentially extending shoulder 130 of the annulus 116 may be configured for being received by a shoulder 132 defined within the inner groove 131 of the compression collar 124. In this manner, the annulus 116 may be engaged with the shoulder 132 of the compression collar 124 to form a fastener assembly that is one integral portion. Alternatively, the annulus 116 may have a compression and deflection characteristic such that an operator can press opposing portions of the annulus 116 and then position the annulus 116 into the compression collar 124 before releasing the annulus 116 into selective engagement with the compression collar 124. In one or more embodiments, the inner groove 131 may be generally converging, diverging, or generally straight in orientation.

The compression of annulus 116 by compression collar 124 upon tightening of the fastener 110 against working surface 126 may be provided for increasing the vibrational or anti-rotational properties of the annulus 116. For example, compression of the annulus 116 may induce a spring bias engagement force between the annulus 116 and the compression collar 124. In this manner, the induced spring bias counteracts vibrational forces that may occur during use of equipment and the like that utilizes the fastener assembly 110. Additionally, frictional and other forces may be induced by engagement of an inner portion of the annulus with the shank 122 of the elongate fastener 120. In one or more embodiments, the inner portion may include a threaded portion configured for receiving the threaded portion of the shank 122.

The opposing radial cutout sections 34, 134 illustrated in FIGS. 3 and 4, and 9A and 9B, respectively are positioned distal the nut 12 or insert 112. The radial shape of the cutout 34, 134, the opposing position of the cutouts, and the proximity to the nut 12 and/or insert 112 offers several advantages, including providing a springing force when the annulus is deflected (as opposed to collapsing) and provides a dampening function. Further, the radial shape is less likely to fracture than cutout sections 34, 134 with angles, such as an orthogonal or triangular cutout. This is particularly important when the fastener or fastener assembly is being reused, as a first use, and each subsequent use, may cause deformations, particular at the flex point of the annulus. Each radial cutout may act as a stiffener, reducing the structural stiffening occurring in the remaining portions of the fastener or fastener system. In some embodiments, the insert 112 may extend from the nut 12 and the two may be unitarily constructed. In some embodiments, the insert 112 and annulus 116 may form a unitary and continuous outer surface, with the annulus 116 either tapering or remaining coextensive with the outer surface of the insert 112.

Figure 10A:
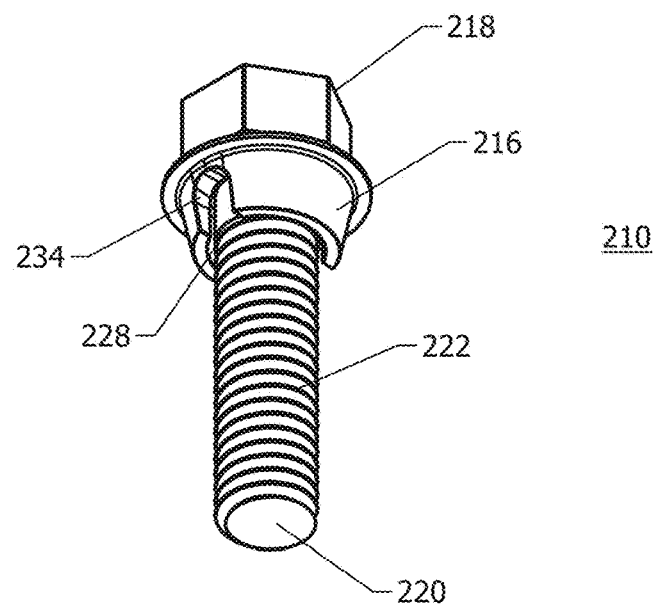
FIG. 10A illustrates a perspective view of a fastener assembly according to one or more embodiments disclosed herein.
Figure 10B:
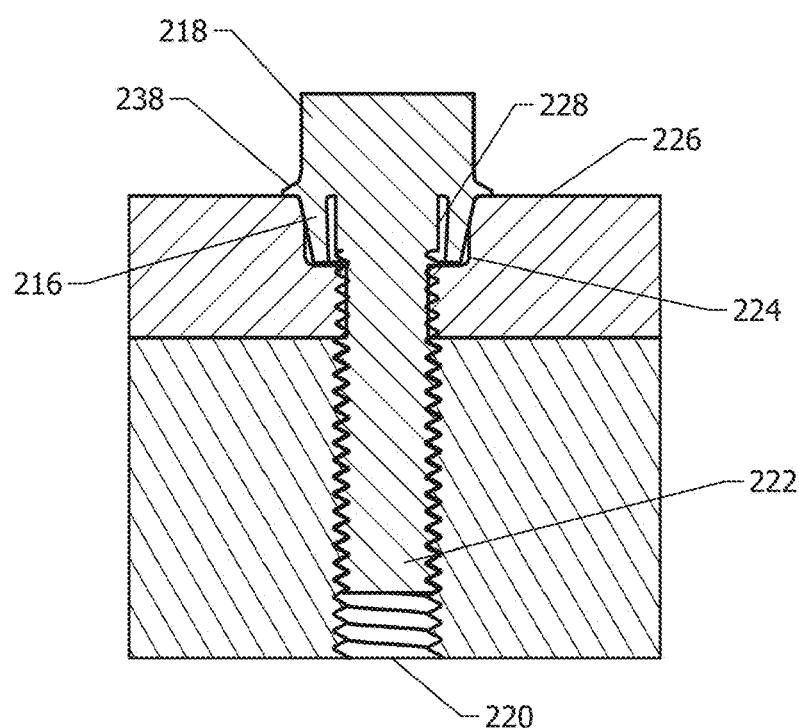
FIG. 10B illustrates a cross-sectional view of a fastener assembly according to one or more embodiments disclosed herein.

A fastener sharing some characteristics with fastener 110 is illustrated in FIGS. 10A and 10B and generally designated 210. The fastener assembly 210 includes an annulus 216 that extends from a head 218 of fastener 220. Fastener 220 may further include a shank 222 that is engaged with head 218. A recess 224 is defined within a working surface 226 of an article to be worked. The recess 224 may be a square cutout as shown or may define any other appropriate shape. A gap 228 may be defined between the shank 222 and the annulus 216. The head 218 may further define a shoulder 238 that is configured for engaging with the working surface 226.

The annulus 216 is configured to have a portion having a size that is greater than recess 224 in a first, undeflected position. In this manner, as the fastener 220 is rotated into the working surface 226, the annulus 216 is forced downwardly causing a compression thereof. This imparts a spring bias between the annulus 216 and recess 224 in a manner similar to that described with fastener 110. A cutout section 234 may be providing for defining a flex point of the annulus 216.

Figure 11A:
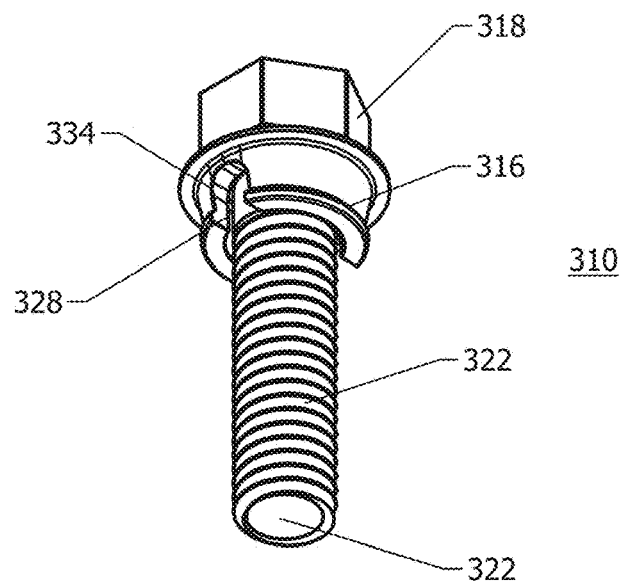
FIG. 11A illustrates a perspective view of a fastener assembly according to one or more embodiments disclosed herein.
Figure 11B:
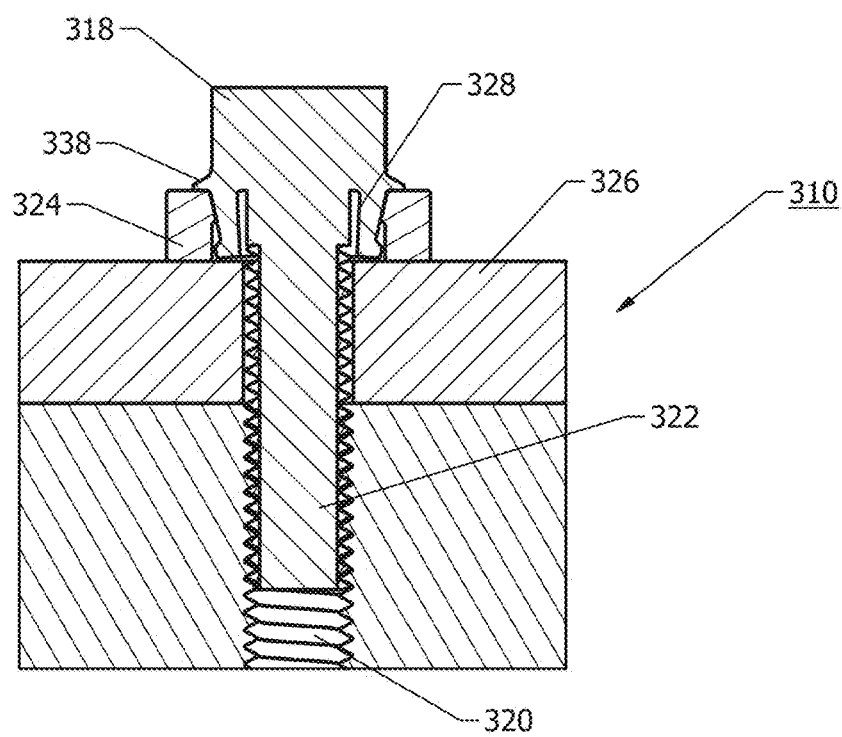
FIG. 11B illustrates a cross-sectional view of a fastener assembly according to one or more embodiments disclosed herein.

Similarly, a fastener sharing some characteristics with fastener 210 is illustrated in FIGS. 11A and 11B and generally designated 310. The fastener assembly 310 includes an annulus 316 that extends from a head 318 of fastener 320. Fastener 320 may further include a shank 322 that is engaged with head 318. A cutout section 334 may be defined in the annulus 336. A compression collar 324 may be provided similar to collar 24 illustrated in FIG. 1. A gap 328 may be defined between the shank 322 and the annulus 316. The head 318 may further define a shoulder 338 that is configured for engaging with the working surface 326.

The annulus 316 is configured to have a portion having a size that is greater than compression collar 324 in a first, undeflected position. In this manner, as the fastener 320 is rotated and travels into the working surface 326, the annulus 316 is forced downwardly causing a compression thereof due to the interaction of the annulus 316 and compression collar 324. This imparts a spring bias between the annulus 316 and compression collar 324 in a manner similar to that described with fastener 10.

The fasteners disclosed herein may be a metallic fastener, or, alternatively, in one or more embodiments, may be polymer or composite based. The fasteners may take many appropriately configured lengths, widths, shapes, or other dimensions.

FIGS. 12A and 12B illustrate a nut 412 devoid of a cutout section as illustrated in one or more embodiments of a nut illustrated herein. The nut 412 may include the annulus 416 and shoulder 430 for engaging with a compression collar. The nut 412 may further define an internally threaded portion 414.

FIGS. 13A and 13B illustrate a nut 512 having a cutout section as illustrated in one or more embodiments of a nut illustrated herein. The nut 512 may include the annulus 516 and shoulder 530 for engaging with a compression collar. A cutout section 534 generally comprising a slot longitudinally extending from about the shoulder 530 may be defined in the annulus 516. The nut 512 may further define an internally threaded portion 514.

Figure 14A:
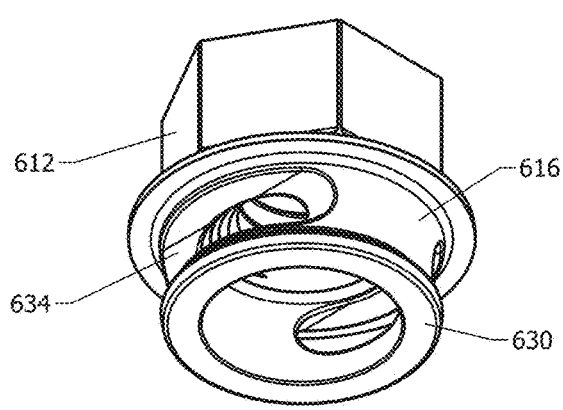
FIGS. 14A and 14B illustrate an annulus according to one or more embodiments disclosed herein.
Figure 14B:
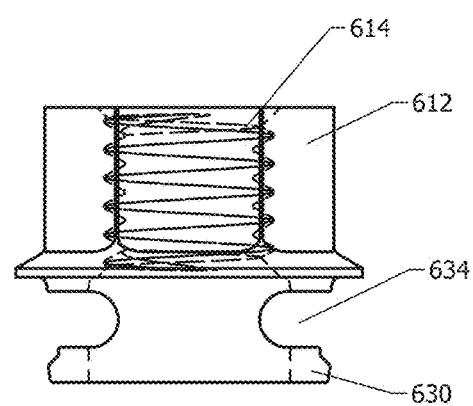

FIGS. 14A and 14B illustrate a nut 612 having a cutout section as illustrated in one or more embodiments of a nut illustrated herein. The nut 612 may include the annulus 616 and shoulder 630 for engaging with a compression collar. A cutout section 634 generally comprising a circumferentially extending slot may be defined in the annulus 616. The nut 612 may further define an internally threaded portion 614.

Figure 15A:
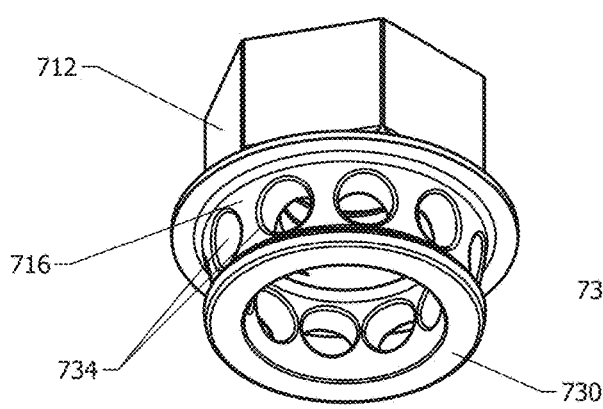
FIGS. 15A and 15B illustrate an annulus according to one or more embodiments disclosed herein.
Figure 15B:
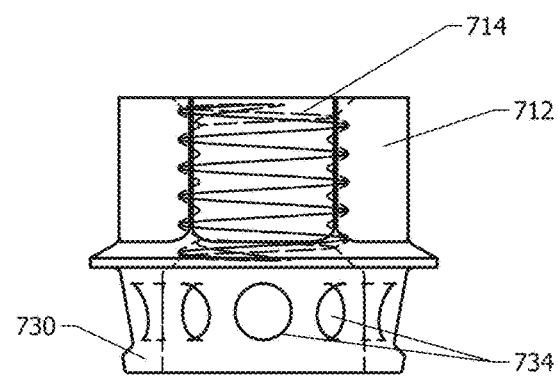

FIGS. 15A and 15B illustrate a nut 712 having a cutout section as illustrated in one or more embodiments of a nut illustrated herein. The nut 712 may include the annulus 716 and shoulder 730 for engaging with a compression collar. A cutout section 734 generally comprising a plurality of circumferentially spaced-apart apertures may be defined in the annulus 716. The nut 712 may further define an internally threaded portion 714.

Figures 16A, 16B, 16C:
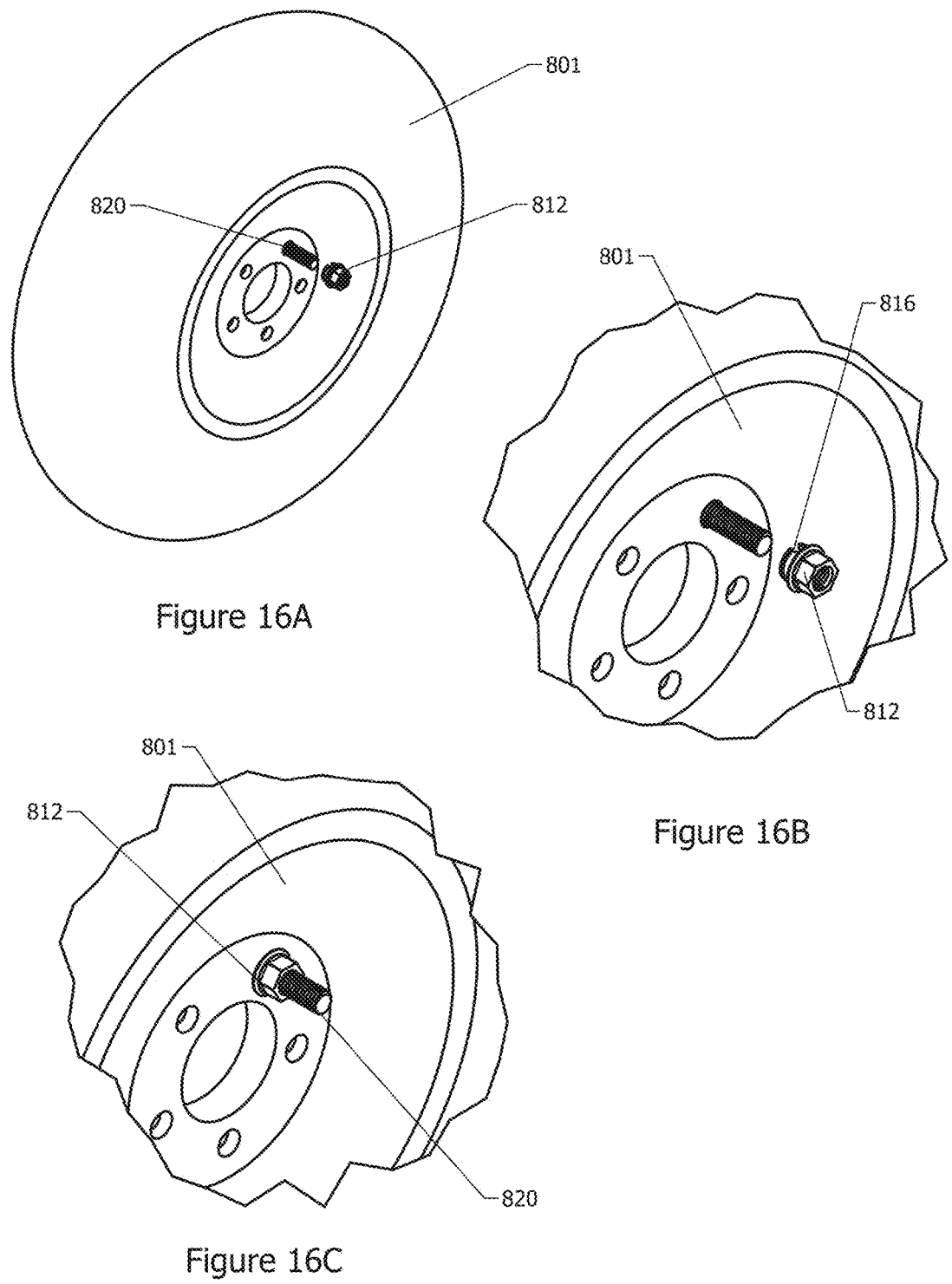
FIGS. 16A, 16B, and 16C illustrate a fastener assembly installed about a working device according to one or more embodiments disclosed herein.

FIGS. 16A, 16B, and 16C illustrate a fastener assembly being installed about a working device according to one or more embodiments. Specifically, the working device is shown as a tire and wheel assembly in which a threaded shank 820, such as a wheel stud, extends from a hub (not illustrated) through the wheel assembly 801 and receives fastener 812. As illustrated in FIG. 16A, the fastener assembly 812 is spaced-apart from the threaded shank 820. An enlarged, partial view is illustrated in FIG. 16B. As illustrated in FIG. 16C, the fastener assembly 812 such that annulus 816 is received within a recess of the wheel assembly 801. The recess of the wheel assembly 801 is configured to have a dimensional characteristic such that as the fastener assembly 812 is tightened and the annulus extends into the recess, an interference fit compresses the annulus 816 inwardly in a manner similar to fastener 12 illustrated in FIG. 1.

Figure 17:
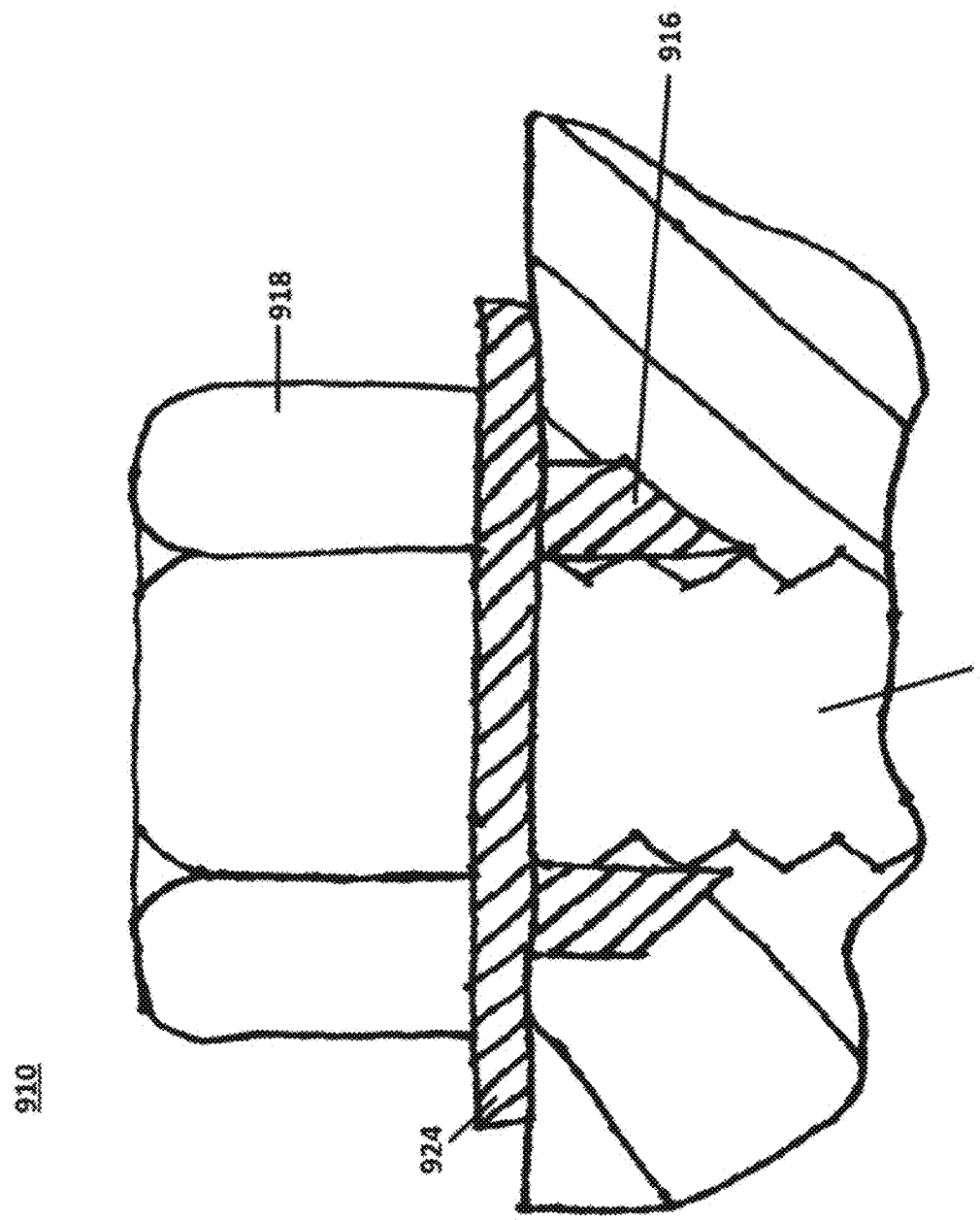
FIG. 17 illustrates a fastener assembly installed about a working surface according to one or more embodiments disclosed herein.

FIG. 17 illustrates a fastener assembly 910 according to one or more embodiments. The fastener assembly 910 includes a bolt 918 having a threaded shank 922 extending therefrom. A washer assembly 924 is provided between the bolt 918 and working surface. An annulus 916 may extend from the washer 924 and is configured for being receiving within a blind hole of the working surface. Tightening of the bolt 918 causes flexing of annulus 916 within the blind hole, thus providing a biasing force that retards vibrational forces.

Figure 18:
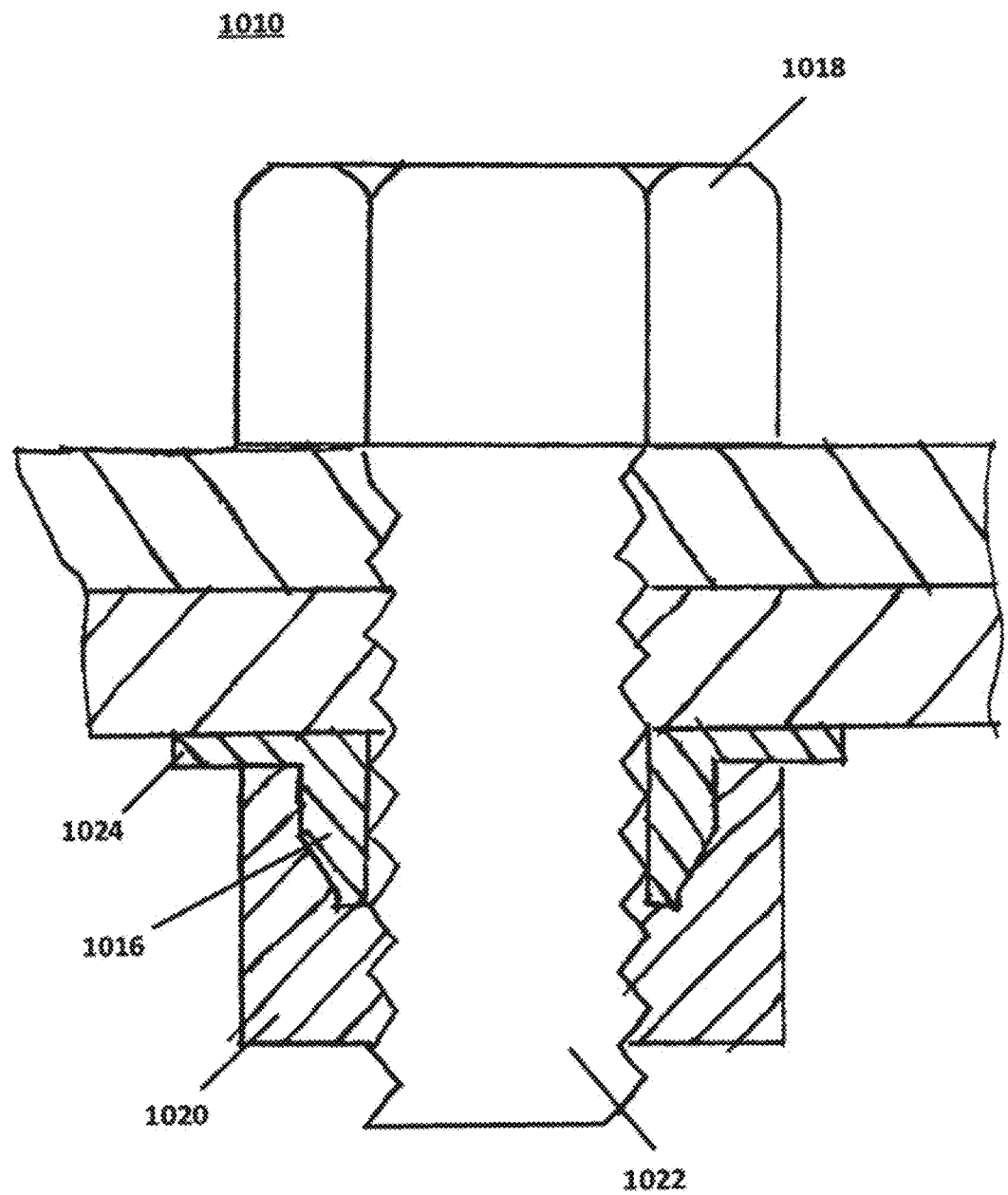
FIG. 18 illustrates a fastener assembly installed about a working surface according to one or more embodiments disclosed herein.

FIG. 18 illustrates a fastener assembly 1010 according to one or more embodiments disclosed herein. The fastener assembly 1010 includes a bolt 1018 having a threaded shank 1022 extending therefrom. A washer assembly 1024 is provided in communication with a nut assembly 1020. The washer assembly 1024 may include an annulus 1016 extending therefrom that is configured for being receiving within a recess of nut assembly 1020. Tightening of the bolt 1018 and nut assembly 1020 causes flexing of annulus 1016 within the blind hole, thus providing a biasing force that retards vibrational forces.

In some embodiments, a blind hole, and/or through hole, similar to the blind hole illustrated in relation to FIGS. 17 and 18 may interact with a fastener similar to the fastener 812 depicted in FIGS. 16A-16C, the fastener 210 depicted in FIGS. 10A and 10B or the fastener 310 depicted in FIGS. 11A and 11B. Other holes or fasteners may also be comparable. In such embodiments, the blind hole may operate similar to any of the compression collars 24, 124, 324 described herein, and may be constructed and/or modified to include features similar to any of the compression collars 24, 124, 324 described herein. A blind hole may be reamed, drilled, tapped, punched or milled to a specific or minimum depth within a working surface without breaking through to the other side of the working surface. Depending on the construction process of the blind hole, the circumference of the entrance to the blind hole may have consistency issues or deformation features thereabout. In some embodiments, the blind hole's circumferential entrance features may provide a frictional element. The annulus may also include frictional features on an inwardly-facing or outwardly-facing side. In some embodiments, the blind hole's entrance may have a diameter greater than the remaining portion of the blind hole; in such embodiments, the annulus may not be tapered, instead the shape of the blind hole may be sufficient to accept and deflect the annulus, even if the undeflected annulus is shaped cylindrically with parallel sides, and even if the parallel sides have an outer diameter greater than the inward diameter of the remaining portion of the blind hole.

In any of the embodiments disclosed herein, the geometry and shape of the annulus may be configured for interacting with the compression collar 24, 124, 324 or blind hole and requiring as much pressure as can be tolerated by the tool used to engage the compression collar 24, 124, 324 or blind hole and the annulus. As the force required to engage the compression collar 24, 124, 324 or blind hole and the annulus increases, a larger amount of preload is applied to the annulus before contact is made between the nut and the collar 24, 124, 324 or blind hole. Increasing the outer diameter of the collar 24, 124, 324 may stiffen the collar 24, 124, 324 and permit more of the load to be preloaded as the collar 24, 124, 324 has a greater radial resistance. Increasing the taper angle of the annulus may also permit more of the load to be preloaded, as the annulus is deflected to a greater degree. The ratio of the collar thickness to annulus thickness (average or greatest) and/or insert thickness may be 1:1, 2:1, 3:1, 4:1 or even greater. The angle of the annulus may be eight, ten, twelve, sixteen, twenty, or twenty-four degrees. Other degrees may be envisioned. Furthermore, increasing the base diameter of the annulus may result in increased energy storage; some embodiments extend the base of the annulus to the outer diameter of the nut 12 or insert 112 (the nut having two possible outer diameters—one formed by the outermost edges of the nut 12 and one formed using the largest diameter positioned wholly within the nut's edges).

By using the fastener or fastener assembly with a blind hole or through hole, the void created by the hole is filled, thereby integrating the fastener, fastener assembly and/or bolt with the frame for a more secure joint. Further, when a tapered annulus and/or hole is used, the fastener or fastener assembly may be self-centering. The annulus may include a double-taper, where one taper angle extends from the nut and/or insert and a second taper angle extends from the first taper angle towards the end of the annulus; the second taper angle is particularly useful when positioning the fastener or fastener assembly into a hole with larger tolerances or manufacturing anomalies.

Figure 19:
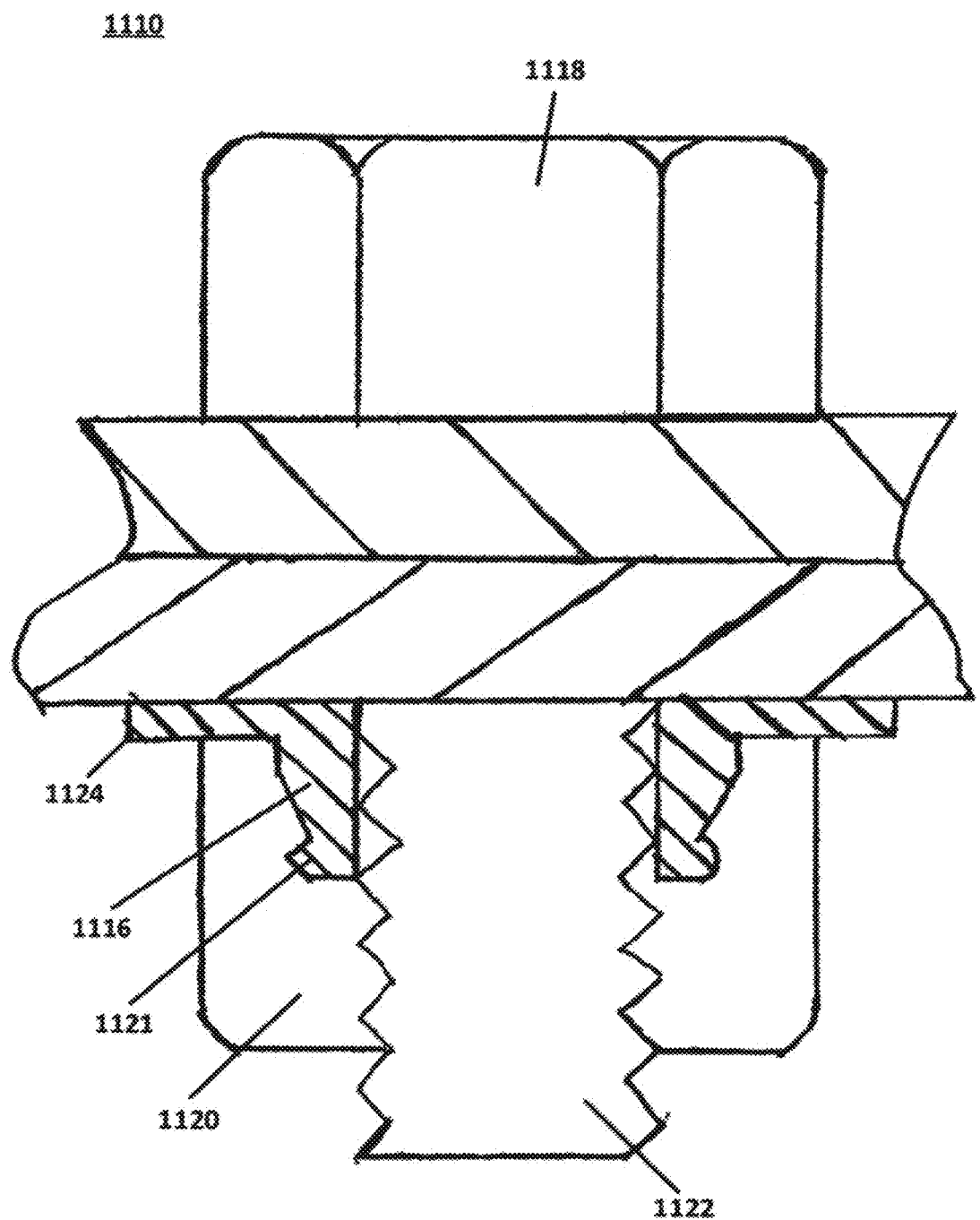
FIG. 19 illustrates a fastener assembly installed about a working surface according to one or more embodiments disclosed herein.

FIG. 19 illustrates a fastener assembly 1110 according to one or more embodiments disclosed herein. The fastener assembly 1110 includes a bolt 1118 having a threaded shank 1122 extending therefrom. A washer assembly 1124 is provided in communication with a nut assembly 1120. The washer assembly 1124 may include an annulus 1116 extending therefrom that is configured for being receiving within a recess of nut assembly 1120. Annulus 1116 may further define a flange 1121 that is configured for retaining washer assembly 1124 about the nut assembly 1120. Tightening of the bolt 1118 and nut assembly 1120 causes flexing of annulus 1116 within the recess, thus providing a biasing force that retards vibrational forces.

Figure 20:
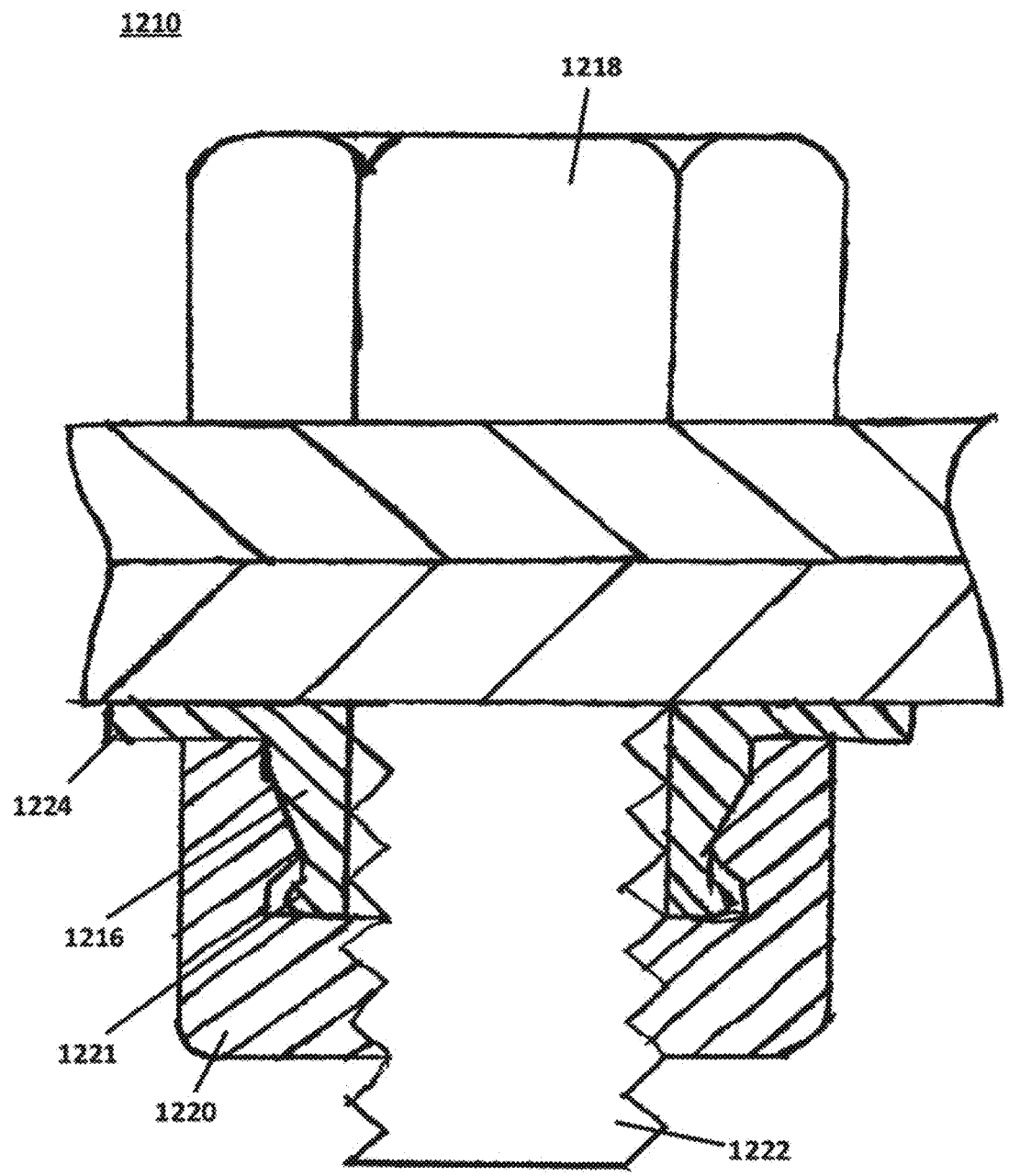
FIG. 20 illustrates a fastener assembly installed about a working surface according to one or more embodiments illustrated herein.

FIG. 20 illustrates a fastener assembly 1210 according to one or more embodiments disclosed herein. The fastener assembly 1210 includes a bolt 1218 having a threaded shank 12122 extending therefrom. A washer assembly 1224 is provided in communication with a nut assembly 1220. The washer assembly 1224 may include an annulus 12116 extending therefrom that is configured for being receiving within a recess of nut assembly 1220. Annulus 1216 may further define a flange 1221 that is configured for retaining washer assembly 1224 about the nut assembly 1220. Tightening of the bolt 1218 and nut assembly 1220 causes flexing of annulus 1216 within the recess, thus providing a biasing force that retards vibrational forces.

While the embodiments have been described in connection with the preferred embodiments of the various Figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A fastener assembly comprising:
a fastener head having a circumference and further defining an elongate threaded shank extending therefrom;
an annulus in contact with the fastener head and extending from the fastener head and defining an annular end distal from the fastener head, wherein the annulus defines a cutout section along a length thereof for providing a flex point,
wherein the annulus is configured for being radially compressed by a hole defined in a working surface upon tightening rotation of the fastener head when the annulus has been received within the hole.

2. The fastener assembly of claim 1, wherein the annulus end defines a shoulder that catches on an internally circumferentially extending rim of the blind hole.

3. The fastener assembly of claim 1, wherein the annulus is free of threads on an inner facing surface thereof.

4. The fastener assembly of claim 1, wherein the hole defines a taper for applying progressively increasing compression of the annulus end.

5. The fastener assembly of claim 1, wherein the annulus defines a taper from the fastener head to the annulus end.

6. The fastener assembly of claim 1, wherein the annulus defines a first taper from the fastener head towards the annulus end and a second taper extending from the first taper to the annulus end.

7. The fastener assembly of claim 1, wherein the annulus and fastener head are coaxially aligned.

8. The fastener assembly of claim 1, wherein the annulus consists of two cutout sections positioned opposite of each other.

9. The fastener assembly of claim 1, wherein an outwardly facing surface of the annulus contains textures or grooves for engaging the blind hole.

10. The fastener assembly of claim 1, further including a nut positioned adjacent the fastener head on an end distal the annulus, and a threaded bolt extending from the nut and through the annulus, wherein the bolt is configured to be accepted by the blind hole.

11. The fastener assembly of claim 10, wherein the annulus end defines a shoulder that catches on an internally circumferentially extending rim of the hole.

12. The fastener assembly of claim 10, wherein the annulus is free of threads on an inner facing surface thereof.

13. The fastener assembly of claim 10, wherein the hole defines a taper for applying progressively increasing compression of the annulus end.

14. The fastener assembly of claim 10, wherein the annulus defines a taper from the fastener head to the annulus end.

15. The fastener assembly of claim 10, wherein the annulus defines a first taper from the fastener head towards the annulus end and a second taper extending from the first taper to the annulus end.

16. The fastener assembly of claim 10, wherein the annulus and fastener head are coaxially aligned.

17. The fastener assembly of claim 10, wherein the annulus consists of two cutout sections positioned opposite of each other.

18. The fastener assembly of claim 10, wherein an outwardly facing surface of the annulus contains textures or grooves for engaging the blind hole.

* * * * *